Feb. 1, 1944. C. P. DANIEL 2,340,648
MINE CAR WHEEL AND AXLE ASSEMBLY
Original Filed Aug. 8, 1938
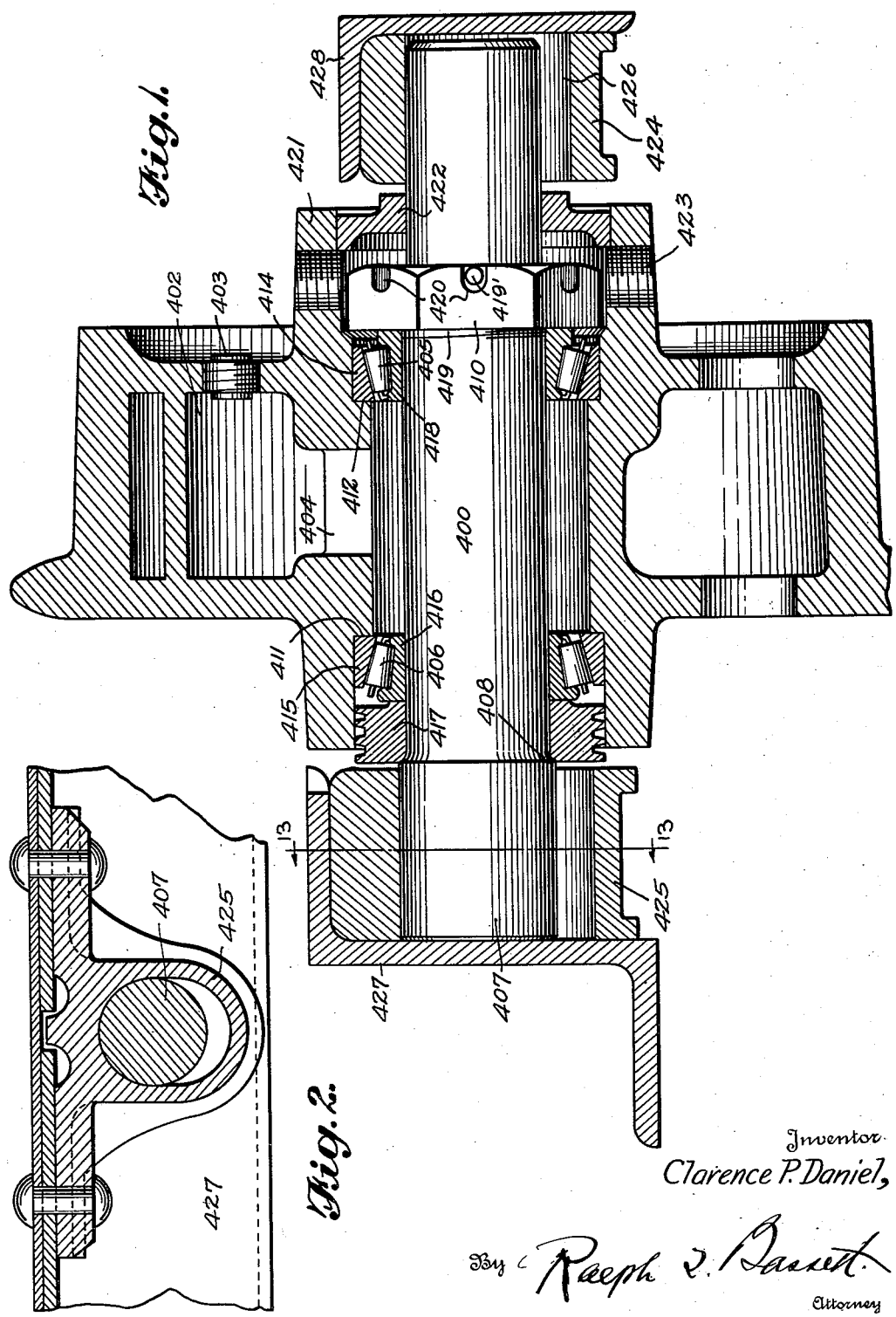
Inventor
Clarence P. Daniel,
By Raeph L. Bassett.
Attorney Patented Feb. 1, 1944

2,340,648

UNITED STATES PATENT OFFICE 2,340,648

MINE CAR WHEEL AND AXLE ASSEMBLY

Clarence P. Daniel, Bristol, Va.

Original application August 8, 1938, Serial No. 223,771, now Patent No. 2,261,844, dated November 4, 1941. Divided and this application August 6, 1941, Serial No. 405,702

2 Claims. (Cl. 295—42)

This invention relates to mine car wheels and has special reference to hub and axle assemblies for mine cars.

Mine cars may be provided with two distinct types of axles, i. e., the through axle type and the stub axle type. The present embodiments comprehend structures particularly adaptable for the utilization of stub axles and comprises the use of boxings, supporting angles, hub closures and bearing elements so constructed and arranged that interchange of certain of the parts is possible, particularly the interchange of different types of wheels and bearings in the boxings and supports therefor.

One of the important features of the present invention is to provide means for easily and accurately adjusting the wheels and axle assemblies including the bearings and raceways therefor.

Another object of the invention is to furnish a running gear or truck which may be within a range of gross load capacity from sixteen thousand pounds to twenty thousand pounds per car without the necessity of changing the basic car under structure design insofar as the wheel supporting means is concerned.

Another object of the invention is to enable substitution and interchange of bearings in mine cars to permit a standardization of these parts by an operator.

It is a further object of the present development to provide seals for the wheel and axle bearings in which the clearances are closely machined at the points where the axles pierce the inside and outside hubs.

Many additional features will be apparent from the following specification and claims taken in connection with the drawing, in which Fig. 1 is a section of another modification of a wheel axle and bearing assembly with the supporting parts associated therewith, the wheel and hub being in elevation, and Fig. 2 is a section on line 13—13 of Fig. 1.

The present application is a division of application Serial No. 223,771, filed August 8, 1938, Patent No. 2,261,844 of Nov. 4, 1941.

Figs. 1 and 2 disclose a structure embodying the use of the stub axle 400, a hollow wheel 401 having grease chamber 402 and oil feed 403, with a grease port 404 feeding the lubricant to the roller bearings 405 and 406. The roller bearings being arranged in the hub openings at spaced points in a manner to be hereinafter described. The stub axle is slightly enlarged at its inner end 407 to provide shoulders 408 and at a point intermediate the shoulder 408 and the outer extremity of the stub axle, there is formed the screw threaded portion 409, which receives the nut 410. The cylindrical wall of the hub opening is counterbored from each end to provide the inner annular shoulder 411 and outer annular shoulder 412 against which the outer bearing races 414 and 415 inwardly abut. The inner race 416 of the inner bearing assembly 406 engages the inner face of the collar 417, the inner collar forming the inner closure for the hub opening and engaging the shoulder 408 of the stub axle. Thus the inner roller bearing assembly 406 including the inner and outer race 415 and 416 is confined between the shoulder 411 of the hub and the inner face of the collar 417. In the outer bearing assembly 405, the inner race 418 abuts against the inner face of the nut 410 on the threads 409 of the stub axle 400. Inasmuch as the outer race 414 engages the annular hub shoulder 412 it will be apparent that this bearing assembly 405 is confined between the inner face of the nut 410 and the shoulder 412 and this bearing as well as the bearing 406 may be properly positioned and seated by the adjustment of the nut 410. A pin 419 extends through the threaded portion of the stub axle and registering slots 420 of the nut to lock the same in a preselected position essential in securing the proper seating of the roller bearings. It will be noted that the nut 410 is confined within the cylindrical hub extension 421 and a hub closure 422 is provided for completing the nut confining chamber. The hub closure 422 preferably has a driving fit with the inner surface of the hub opening although other methods of retaining this closure in place may be substituted. Suitably positioned openings 423 of any desired number are provided in the hub extension 421, these openings being threaded for the reception of plugs, the latter being removable to permit access to the nut and locking pin when adjusting the parts comprising the assembly. The ends of the stub axle are each arranged in cast steel boxes 424 and 425, these boxes being provided with elongated vertical openings 426 in which the axle extremities are arranged for their essential vertical movement. The inner box 426 is secured by suitable means to the side sill 427 while the outer box is secured to the angle 428. One method of securing these cast steel boxes 424 and 425 to their respective angles is illustrated in Fig. 2 and described in other modifications forming part of the present development in applicant's co-pending application Serial No. 480,076.

It will also be observed that the use of closely machined clearance between the moving parts as a seal has been utilized to a maximum as such machined joints are notoriously efficient in securing maximum sealing. Along this general line it has been found that it is possible to hold the clearances, at the points where the axles pierce the inside and outside hubs, to a minimum in this set up. The further use of the grease seals for the bearings themselves and the combination of such grease seals with the close clearances, essentially minimize grease leakage to a degree heretofore unobtained.

Having described the present invention, what I claim is the particular structural features included in the combination defined in the appended claims:

1. In a mine car wheel mounting, a car body, a pair of spaced angle pedestal legs carried by the car body, a wheel, having a hollow hub with inner and outer shoulders formed therein near the ends of said hub, an axle journal formed with a shoulder and arranged in said hub in spaced concentric relation thereto, an outer bearing assembly having an outer race and an inner race and interposed between said hub and journal axle with the outer race fitting in said hub against the outer shoulder, adjustable means within said hub for retaining the inner race in relation to the outer race, means within the hub for locking the adjustable means on said axle, radial openings in said hub for permitting adjustment of said adjusting means, a sealing member for the outer end of said hub, said sealing member being formed with a central opening for the passage of said axle and being spaced outwardly from the adjusting means and having a driving fit with the wall defining said hub opening and an inner bearing assembly including an outer and an inner race, interposed between said hub and axle journal, the outer race of said inner bearing assembly being fitted in said hub and against the inner shoulder, a sealing collar on said axle engaging the inner race at one side and the axle shoulder at the opposite side, and journal means for mounting the ends of the axle in said angle member.

2. In a mine car wheel mounting, a car body, a pair of spaced angle pedestal legs carried by the car body, a wheel, having a hollow hub with inner and outer shoulders formed therein near the ends of said hub, an axle journal in said hub in spaced concentric relation thereto, said axle having a shoulder near its inner end, an outer bearing assembly having an outer race and an inner race and interposed between said hub and journal axle with the outer race fitting in said hub against the outer shoulder, adjustable means on said axle and within said hub for retaining the inner race in relation to the outer race, means within said hub for locking the adjustable means on said axle, radial openings in said hub for permitting adjustment of said adjusting means, a hub closure on said axle for sealing the outer end of said hub opening, said closure being spaced outwardly from said adjusting means and said radial openings and being substantially confined within said hub, and an inner bearing assembly including an outer and an inner race, interposed between said hub and axle journal, the outer race of said inner bearing assembly being fitted in said hub and against the inner shoulder, a sealing collar on said axle engaging the inner race at one side and the axle shoulder at the opposite side, and journal means for mounting the ends of the axle in said angle member.

CLARENCE P. DANIEL.